UNITED STATES PATENT OFFICE.

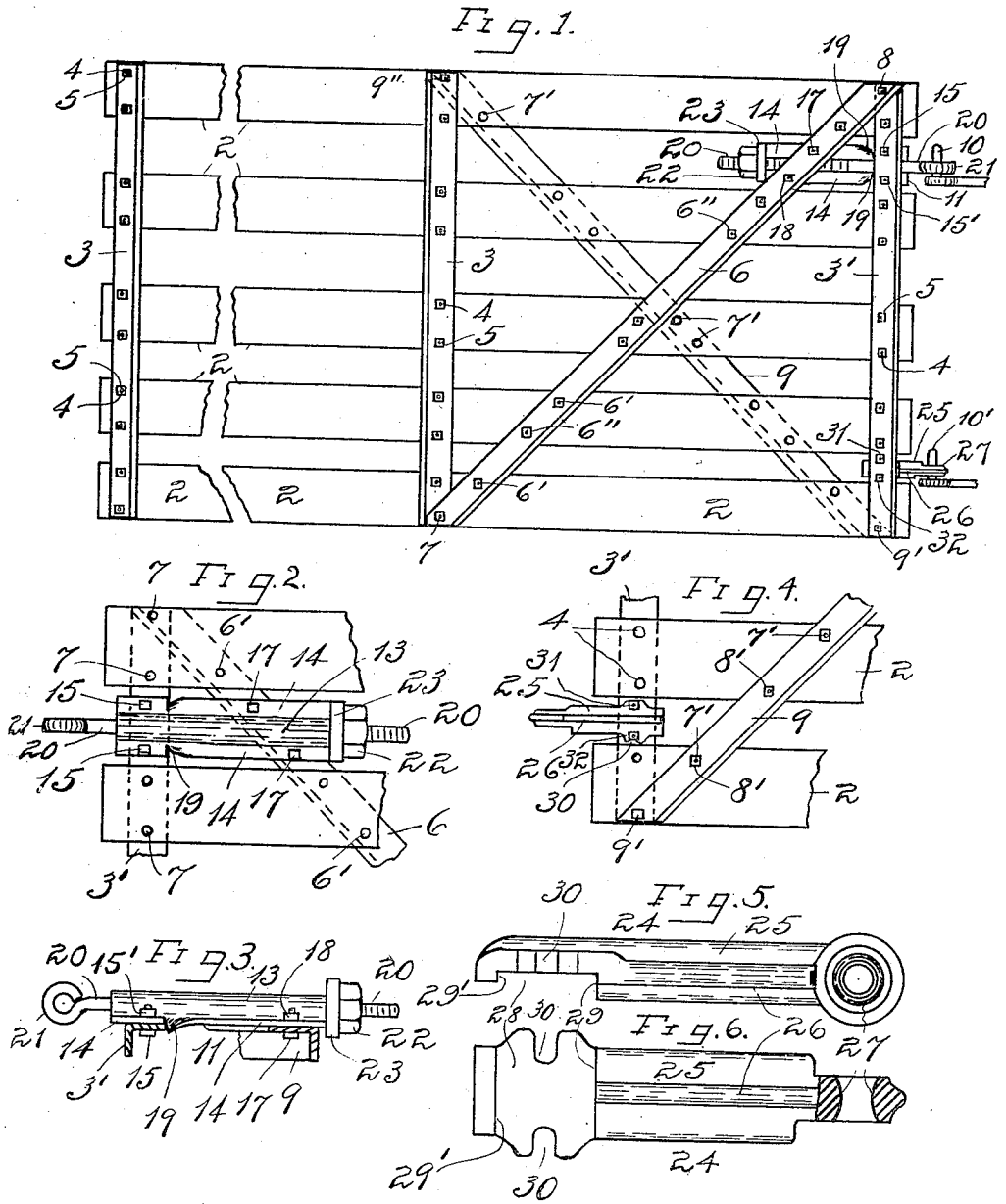

GUSTAVE WENZELMANN, OF GALESBURG, ILLINOIS.

GATE-HINGE.

1,133,417.  Specification of Letters Patent.  Patented Mar. 30, 1915.

Application filed January 9, 1914. Serial No. 811,241.

*To all whom it may concern:*

Be it known that I, GUSTAVE WENZELMANN, a citizen of the United States, and a resident of Galesburg, in the county of Knox and State of Illinois, have invented a new and useful Gate-Hinge, of which the following is a specification.

My present invention relates to horizontally swinging gates, and particularly to that general class thereof which are employed as farm gates and which because of their relatively great length are prone to sag or droop at their free ends. This sagging, it is to be understood, while sometimes caused by inferior construction as regards the gate body, or by its being insufficiently braced, is much more frequently caused by the fact that the weight and leverage of the gate draws the supporting post into an inclined position and thus permits the gate body to drop, and in swinging, to drag (at its free end) over the ground. In either event—*i. e.*, the sagging of the gate body *per se* or the inclination thereof attributable to a similar inclination of the supporting post, there were two problems to solve in order to provide a gate in which neither of these objectionable features was present, and the primary object of my invention, concisely stated, is to provide a gate so constructed and arranged that it possesses neither of said defects.

More specifically stated, it is an object to so construct a gate body that the several parts or elements thereof coact to form a novel hinge-rod and casing which not only serve to provide an adjustable hinge, but the casing member of which is so constructed that it acts as a brace between the inner gate-standard and the truss or brace member of the gate, and inasmuch as these members are secured to the slats, the entire gate body is made more rigid.

It is an object to provide novel means whereby should the gate-supporting post become inclined toward the gate, (thus allowing the free end of the latter to drop,) the upper hinge elements may be adjusted to raise said dropped end until the gate body reassumes its normal position, which, of course, is horizontal or substantially so.

It is a further object to provide novel means whereby the said free end may be elevated at will (without interfering with or adjusting any of the mechanism) to raise it out of deep snow, in order that it may freely swing, or to permit the passage of small animals thereunder.

Other objects will presently appear—some of these will be obvious and others will be specifically pointed out.

A preferred embodiment of the invention is shown in the accompanying drawings, in which the several elements and, where necessary, the factors thereof, are each designated by a distinguishing reference numeral, uniformly employed throughout the several views.

In said drawings: Figure 1 is a front elevation; Fig. 2, an enlarged detail, a side elevation, seen from the opposite side of the gate; Fig. 3, an enlarged detail, a top plan, partly in horizontal section; Fig. 4, an enlarged detail, seen from the same side of the gate as is Fig. 2; and Figs. 5 and 6 respectively, a top plan and a side or face elevation of the lower hinge, seen from the same side of the gate as is Fig. 1, the eye end of Fig. 6 being shown in section, and both figures greatly enlarged.

Coming now to a detailed description of said drawings, 2, 2 designate ordinary gate slats, and 3, 3, the usual angle-iron standards fixed thereto by bolts 4 and nuts 5.

10, 10′ designate pintles. These of course may be gate supporting members, or hinge members, of any suitable construction, and if changed from what shown, the eye 21 presently referred to will be accordingly changed.

11 designates the upper hinge member proper, and comprises an elongated casing the longitudinal central portion 13 of which is concavo-convex or semi-tubular in cross-section and from which project laterally arranged flanges or extensions 14. Each flange is provided with apertures for the reception of bolts 15 by means of which, together with nuts 15′, the staple 11 is secured to the standard 3′, and said flanges are provided with like apertures for the reception of bolts 17, which, with nuts 18, secure it to the brace 6. As shown best in Figs 2 and 3 the flanges 14 are slitted and then bent inwardly to form clips 19 which rest squarely against the contiguous edge of the standard 3′. The concave of the casing 11 provides a guide or way for a hinge-rod 20 provided at its inner end with a pintle-receiving eye 21 and at its outer end with threads, the latter engaged by an adjustment nut 22. The standard 3′ and truss member 6 complete a closure for said guide, whereby the rod 20 is securely retained and whereby the gate body and all parts fixed thereto may move freely with relation to said rod, whether the movement be caused by adjustments of the nut 22 or whether it be caused by the operator raising the free end of the gate. An anti-friction washer 23 is preferably interposed between the nut 22 and the adjacent end of the casing 11; and the eye 21 being made of a rod circular in its cross section will be free to move or flex slightly on the pintle 10. The casing may be either a casting or a stamping.

The eye 21, being held by the pintle 10, restrains the nut 22 from forward movement, and it and the washer 23 restrain the staple 11 from like movement, and said staple being rigidly secured to the brace 6 and standard 3' restrain them in like manner, and in this they are aided by the clips 19, which lock the upper portion of said standard.

Should the gate body after long usage sag, proper adjustments of the nut 22 will replace it in normal position. Should it be desired to elevate the free end of the gate body, further adjustment of said nut will cause the casing 11 to be forced backwardly on the rod 20 to thereby tilt said body as desired. And should the supporting post become inclined toward the gate, causing its free end to droop or sag, adjustments of said nut toward the post will drive said casing backward and it will carry with it the entire gate body, the pintle 10 then acting as a fulcrum, whereby said free end will be elevated and the gate thus reassume its proper operative position.

It is difficult to so hang a gate of this character that it will swing in a true horizontal plane, or in such other plane as might be desired, owing primarily to the fact that it is an operation for a skilled workman only to place both pintles in a post in such manner that they will correspond in inclination, etc. It will be seen that even though the pintles 10 and 10' be differently inclined, or though one project farther than the other, the inequality may be remedied by a simple adjustment of the nut 22.

It is to be noted that both the upper and lower hinges are secured only to the metallic portions of the gate body. The benefits arising from this structure are that there will be no weakening, splitting or wear on the wood slats caused by the passage of the bolts therethrough and the relatively great strain of the weight of the gate thereon.

Having thus described the nature, purposes, objects, operation and advantages of my invention I claim as new and desire to secure by Letters Patent the following, namely:

1. In a gate hinge, an elongated casing having slitted lateral extensions, a portion of each of said extensions bent to form a clip, a hinge-rod having a threaded end, arranged for movement longitudinally in said casing, and a nut engaged with the threads on said rod.

2. In a gate hinge, an elongated casing having a raised semicircular longitudinal central portion and having slitted lateral extensions, a portion of each of said extensions bent to form a clip, a hinge-rod slidably seated in the concave of the casing, and a nut threaded on one end thereof.

In testimony whereof I hereto subscribe my name this 5th day of January, 1914.

GUSTAVE WENZELMANN.

Witnesses:
L. F. WERTMAN,
J. F. ANDERSON.

Copies of this patent may be obtained for five cents each, by addressing the "Commissioner of Patents, Washington, D. C."